United States Patent [19]

Danel et al.

[11] 4,345,658

[45] Aug. 24, 1982

[54] VEHICLE ABLE TO MOVE BY ADHESION ON A RANDOM SURFACE

[75] Inventors: François Danel, Vendome; Henri Nicollet, Montreuil; Paul Marchal, Gif-sur-Yvette; Marc Robin, Rambouillet; Jean Vertut, Issy-les-Moulineaux, all of France

[73] Assignee: Commissariat A l'Energie Atomique, Paris, France

[21] Appl. No.: 77,380

[22] Filed: Sep. 20, 1979

[30] Foreign Application Priority Data

Sep. 29, 1978 [FR] France ................................ 78 27905

[51] Int. Cl.³ .............................................. B62D 57/02
[52] U.S. Cl. ..................................... 180/8 C; 248/362; 294/64 R; 376/249
[58] Field of Search ............... 180/116, 146, 8 R, 8 C, 180/8 D, 901; 176/19 R; 114/222; 15/1.7; 248/362, 363, 615; 294/64 R, 65; 279/3; 271/90, 106, 107

[56] References Cited

U.S. PATENT DOCUMENTS

| 2,725,255 | 11/1955 | Watter | 294/64 R |
| 4,029,164 | 6/1977 | Urakami | 180/164 |
| 4,095,378 | 6/1978 | Urakami | 180/164 |

FOREIGN PATENT DOCUMENTS

| 757522 | 4/1967 | Canada | 294/64 R |
| 2259419 | 8/1976 | France |  |
| 516567 | 6/1976 | U.S.S.R. | 180/8 C |

Primary Examiner—John A. Pekar

[57] ABSTRACT

Vehicle able to move by adhesion on a random surface, with a central body defining a pivoting axis which remains substantially perpendicular to a surface and which has two groups of central supports which adhere to the surface; first and second carriages, each provided with two groups of adhesive end supports; first and second members for the guidance in rectilinear translation and without rotation of the first and second carriages in accordance with two directions which remain substantially orthogonal to the pivoting axis. The first and second carriages are displaceable along the guidance members; the first and second guidance members are pivotal about the pivot axis and the groups of central supports are rotatable about the pivot axis.

14 Claims, 16 Drawing Figures

VEHICLE ABLE TO MOVE BY ADHESION ON A RANDOM SURFACE

BACKGROUND OF THE INVENTION

The present invention relates to a vehicle which is able to move by adhesion on a random surface.

More specifically the invention relates to a motorised vehicle which can move on a wall having a random shape. This surface can be crooked, may have curvatures which differ according to the direction and may have discontinuities, such as ridges or openings.

Known vehicles generally use wheels or caterpillars bearing on the surface in a continuous manner and therefore have limitations in a certain number of cases when required to move on relatively complex surfaces, either as a result of the curvature of said surfaces or as a result of their orientation. Certain animals move by permanently having a certain number of bearing points by their paws and by presenting the paws in a discontinuous manner at successive support points. This has advantages, particularly when walking on a vertical surface or a surface which opposes the force of gravity, when the ends of the paws adhere by a hook-like or sucker-like action.

BRIEF SUMMARY OF THE INVENTION

The invention relates to vehicles which travel in substantially the same way, but without using a structure directly resembling that of insects or quadrupeds. The vehicles according to the invention are intended to walk on random surfaces. They can bear on said surfaces in a very homogeneous manner by a large number of adhesive supports with balancing of the bearing forces on the different supports. Said supports have adhesive members to permit displacement on surfaces which have large gradients or which are even vertical or overhang.

These vehicles are essentially intended to move on surfaces which are not directly accessible to man either due to the limited space available or due to an environment which is unfavourable to man or for man to walk on said walls. Such vehicles can be used in various industrial installations. These applications are more particularly nuclear installations and more specifically for checking and working on nuclear reactor vessels, for example of the fast neutron type cooled by liquid metal. These vehicles are able to move observation apparatus, for example for regularly checking welds either visually (television cameras) or by ultrasonic or electromagnetic transducers.

Experts on fast neutron nuclear reactors cooled by a liquid metal know that the main vessel is surrounded by a safety vessel, whereby only a very limited annular space is left between the two vessels. One of the applications of the vehicle according to the invention is the inspection of these vessels by moving in this annular space.

According to the present invention, the vehicle able to move by adhesion on a random surface has a central body defining a pivoting axis which remains substantially perpendicular to a surface and which has two groups of central supports which adhere to the surface; first and second carriages, each provided with two groups of adhesive end supports; first and second members for the guidance in rectilinear translation and without rotation of the first and second carriages in accordance with two directions which remain substantially orthogonal to the pivoting axis. The first and second carriages are displaceable along the guidance members; the first and second guidance members are pivotal about the pivot axis and the groups of central supports are rotatable about the pivot axis. There may also be provided means for controlling the adhesion state on the surface or the non-adhesion of said supports and means for controlling the displacement means in such a way that the relative pivoting of one of the guidance means about the pivoting axis or the translation of one of said carriages is only possible if the supports associated with the carriage are not adhereing to the surface and if simultaneously the groups of central supports and those of the other carriage adhere on the surface, and in such a way that the displacement in translation of the two carriages relative to the guidance members is only possible if the groups of central supports are disengaged with respect to said surface and the groups of supports associated with the carriages are adhering to the surface.

Preferably the adhesive supports are pneumatic or hydraulic suction members, depending on the medium in which the vehicle moves. These supports can also be electromagnetic.

According to another feature of the invention the means for bringing about the displacement of the central supports in accordance with the direction of the pivoting axis comprise a first shaft parallel to the direction of the guidance members in the inoperative state and means for rotating the shaft about its longitudinal axis integral with the central body, a second shaft parallel to the first shaft and mounted so as to pivot about its longitudinal axis with respect to the body, a ring on which are mounted the two groups of supports in such a way that they pivot about an axis perpendicular to the shafts, two first rod/arm assemblies integral with the ends of the first shaft and the ends of a cardan shaft or universal joint shaft carried by the ring and parallel to said shafts and coinciding with the pivoting axis, two second rod/arm assemblies integral with the ends of the second shaft and the ends of the cardan shaft and means for transmitting a rotation movement in a direction opposite to that of the first shaft to the second shaft from said first shaft.

The invention also relates to a suction member of a type which is especially suitable for the construction of the vehicles defined hereinbefore, but which can also have other interesting applications when it is necessary for the suction members to be able to support a load representing an important component parallel to the wall on which it is fixed. To this end the suction member according to the invention comprises a flared skirt made from an elastic material and having a closed bottom and a free edge constituting a deformable lip, a supporting member arranged within the said skirt and fixed to said bottom, whereby said member has towards the free edge a supporting surface made from a material with a high friction coefficient, and means for producing a vacuum within the skirt.

BRIEF DESCRIPTION OF THE DRAWINGS

The invention is described in greater detail hereinafter relative to two non-limitative embodiments and the attached drawings, wherein show.

DETAILED DESCRIPTION OF THE PREFERRED EMBODIMENTS

Figure 1:
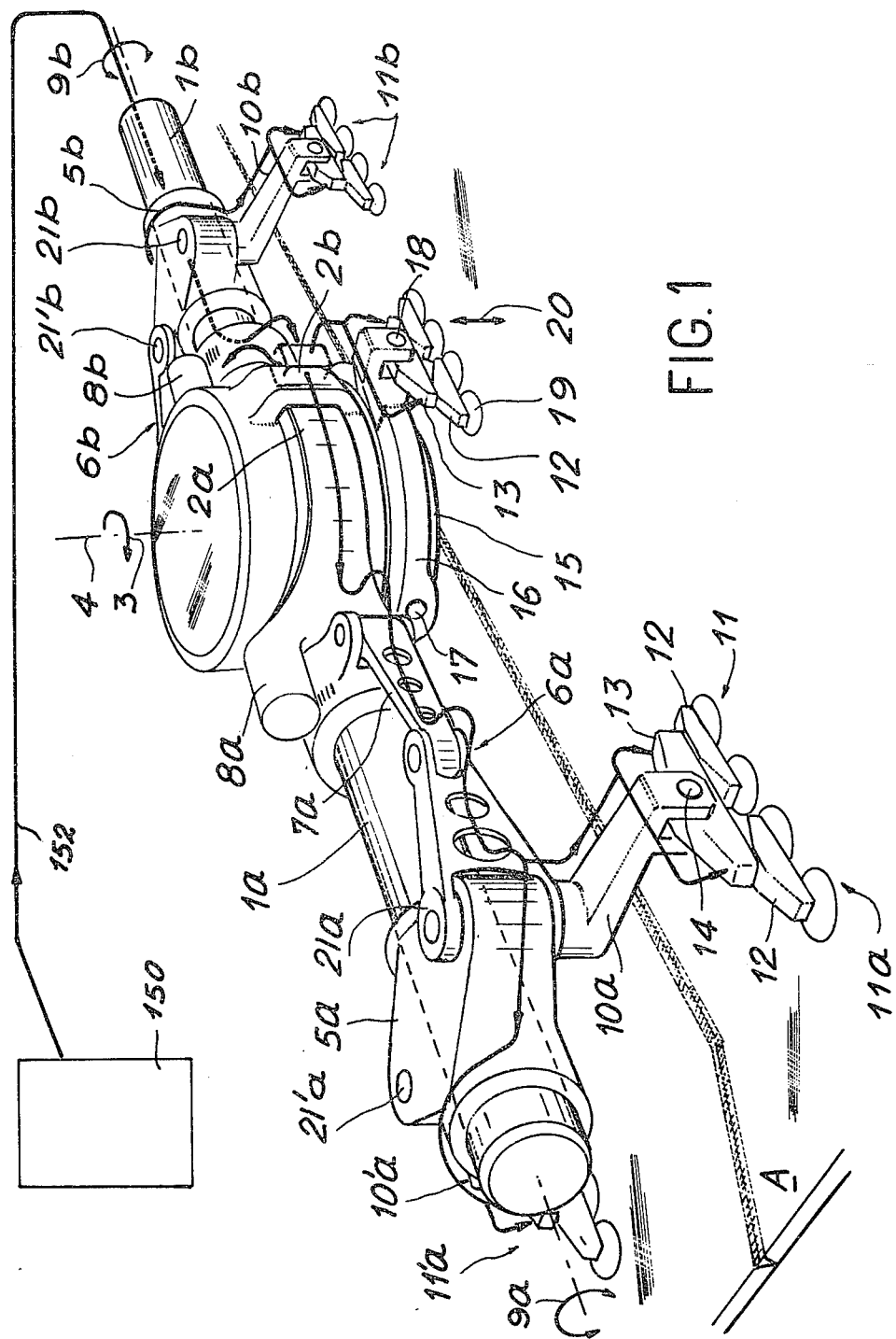
FIG. 1 a perspective view of the first embodiment of the vehicle in which the slides (or translation guidance members) are an extension of one another.

FIG. 1 shows a first embodiment of the vehicle according to the invention. It comprises two tubes 1a and 1b (forming rectilinear translation guidance members) fixed at one end to a member 2a, 2b which rotates about an axis 4. In this particular case tubes 1a and 1b coincide with the pivoting axis 4 and permit an angle slightly greater than 90°. Each tube 1a, 1b respectively carries a carriage 5a, 5b sliding freely along a tube 1a or 1b respectively forming slides. These sliding movements are controlled by actuators, which are not shown in order not to overburden the drawing. Each carriage 5a, 5b is maintained in rotation about the axis of its carrying tube by a pantograph respectively 6a, 7a and 6b, 7b. In the drawing the pantographs are shown with their various pivoting axes parallel to pivoting axis 4, but it is clear that when the surface A on which the vehicle is moving is crooked said pantographs 6a, 7a and 6b, 7b could pass outside the plane in which they are at present shown. This is effected by means of the actuator 8a and a symmetrical actuator 8b, which respectively rotate each carriage and pantograph assembly about the axis of its carrying tube 1a or 1b, said rotation being symbolically indicated by arrow 9a about the axis of tube 1a and arrow 9b about the axis of tube 1b.

Pairs of arms 10a, 10'a and 10b, 10'b are fixed on either side of each carriage 5a, 5b in order to carry the pairs of supports 11a, 11'a, 11b, 11'b by which the vehicle can bear on the traversed surface. Each support is substantially parallel to the axis of the corresponding carrying tube 1a or 1b. As the traversed surface can be curved the suction members are mounted in pairs on levers 12 constituting a bogie supported here on a lever 13 mounted so as to pivot with respect to the end of each arm 10 about a shaft 14, the latter being perpendicular to the axis of the corresponding carrying tube 1a or 1b. It is apparent that the various suction members are subject to the action of equal pressures applied at each point located on the shaft such as 14 at the end of each arm 10. In the particular case where the vehicle bears on the two carriages 5a, 5b the support on surface A is equivalent to four points of shafts 14 and the possibilities of twisting movements 9a or 9b make it possible to make these four support points conform with surface A. Supports such as 11, shown here with suction members, bring about by means of a vacuum circuit which is well known to the expert and is not shown, the adhesion on a relatively smooth surface A, such as the surface of a tank or wall. They could also be in the form of magnetically adhering members. Each suction member or magnet can either form a fixing point or a free point, depending on the control.

Figure 5:
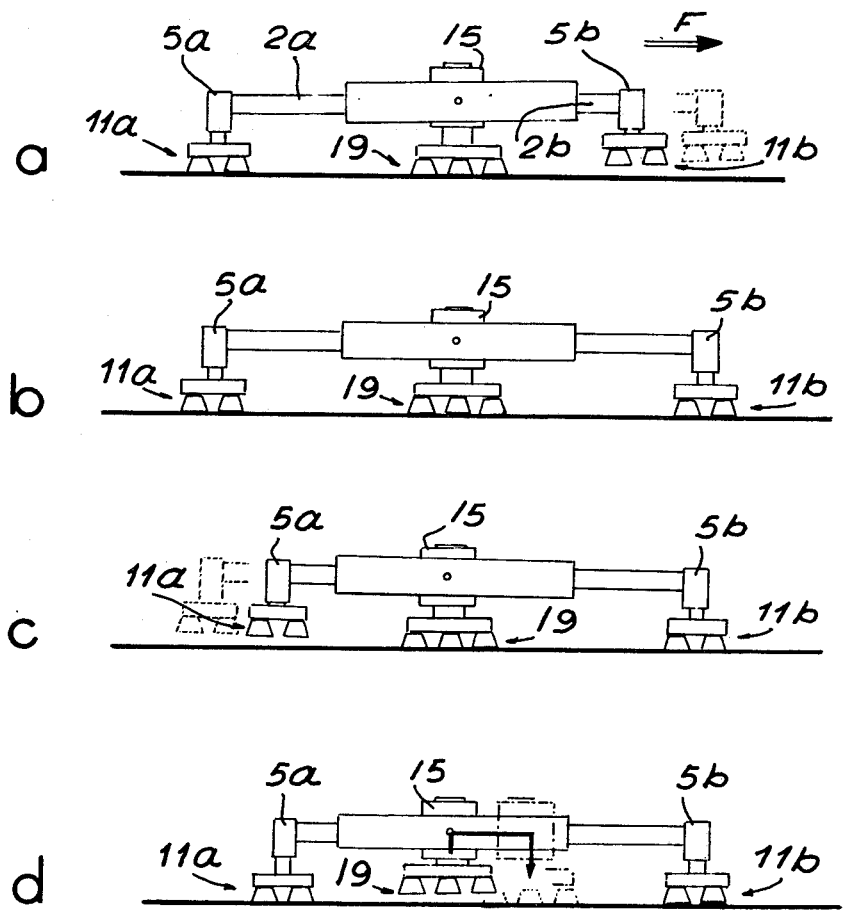
FIGS. 5a, 5b, 5c and 5d simplified views illustrating the way in which the vehicle of FIG. 1 moves in a straight line.

The relative pivoting of tubes 1a, 1b about axis 4 is brought about by an actuator (not shown in FIG. 1) which acts on members 2a, 2b. The actuator will be described hereinafter with reference to FIG. 2 and is placed within the actual articulation. A freely rotating body 15 carries pivoting axis 4, body 15 being positioned below members 2a, 2b. In its lower portion body 15 carries a ring 16 which pivots about the shaft 17 coinciding with axis 4. Ring 16 carries a shaft 18 perpendicular with shaft 17 and which also coincides or substantially coincides with pivoting axis 4. Supports 19 forming suction members and similar to supports 11 are mounted at the ends of shaft 18 constituted by pivot pins, whilst supports 11 are mounted at the ends of arms such as 10 by means of shafts 14. In other words the support 19 visible in FIG. 1 is tangential to ring 16 and the not shown symmetrical support is fixed in the same way in symmetry with respect to the pivoting axis 4. This symmetry is obviously approximate when the operation of shafts 17, 18 permits the two supports 19 to conform on the supporting surface, which is not strictly perpendicular to the pivoting axis 4. A displacement 20, shown only by an arrow in order not to overburden the drawing, permits the shaft 17 carrying ring 16 to slide parallel to the pivoting axis 4, thus permitting the two supports such as 19 of the body to lift and therefore to be disengaged from surface A. Thus, as shown in the drawing, if the two tubes 1a, and 1b are aligned and supports 19 raised, the simultaneous displacements of the two carriages 5a, 5b relative to their tubes 1a, 1b leads to the displacement of body 15 along the straight line materialised by tubes 1a, 1b supported by the two carriages 5a, 5b, bearing on the four points of shafts such as 14, resulting from the contact of the various supports 11a, 11'a, 11b, 11'b, all of which conform with the curvature of the surface. Obviously during this displacement there are variations in the support resultants on the different supports forming the suction members, e.g. 11, whereby this takes place in a slow and progressive manner. When the body has ended its possible travel, e.g. when carriage 5b is in contact with member 2b it is possible to prepare the following stage which consists of bringing about the lowering 20 of supports 19 of body 15, whereby as a result of the said body being mounted on shafts this leads to a bearing distributed over a point substantially on the pivoting axis 4 and to the raising of e.g. the two supports 11b. At the same time the adhesion of suction members 11a and 19 is controlled, whilst freeing that of suction members 11b, leading to the raising of end carriage 5b (cf FIG. 5a). Carriage 5b is then extended on its tube 1b. By raising 20 the supports of the body there is contact of supports 11b with adhesion of the suction members (FIG. 5b). After releasing the suction members 11a it is possible to move in the carriage 5a until it strikes member 2a (FIG. 5c). It is then sufficient to again raise the body to bring back into contact all the suction members 11a, 11b, disengaged suction members 19 and again displace body 15 (FIG. 5d).

Figure 6A:
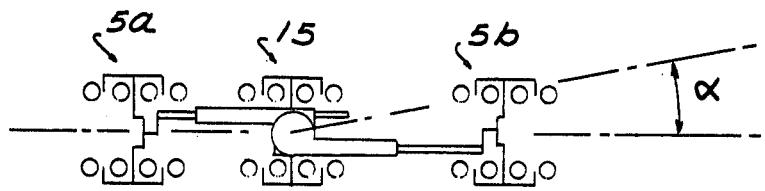
FIGS. 6a, 6b and 6c simplified views illustrating the pivoting of the vehicle shown in FIG. 1.
Figure 6B:
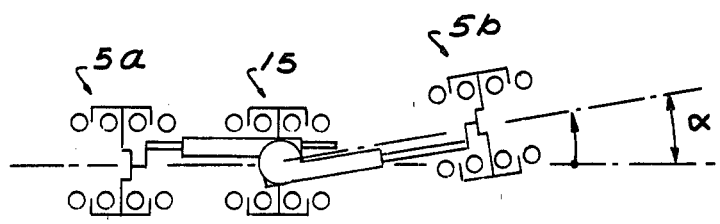
Figure 6C:
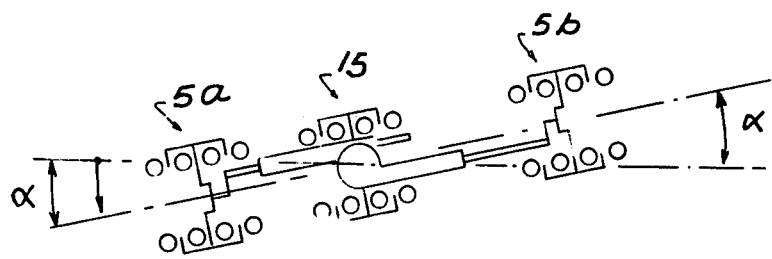

On wishing to change direction before replacing the supports 11b and after extending carriage 5b it is merely necessary to bring about the pivotal movement about axis 4 in the desired direction so as to indicate the direction in which the movement is to take place and then during the moving in of carriage 5a to bring tubes 1a and 1b into alignment in the new direction taken by 1b (cf FIGS. 6a, 6b, 6c). Thus, the presently shown vehicle moves in a polygonal line.

According to the embodiment described hereinbefore tubes 1a and 1b are obligatorily brought into alignment during the displacement of body 15. As a result there is no need to provide possibilities for the rotation of the supports with respect to the carriages. This is adequate in the case where the vehicle is used for inspecting seim-rectilinear welds. When it is desired to obtain a random displacement the supports must be free in rotation with respect to carriages 5a and 5b in accordance with axes substantially perpendicular to the bearing surface. It is then possible to coordinate the displacements of the two carriages on tubes 1a and 1b and to move body 15 when tubes 1a and 1b form an angle between them.

During the advance of a carriage 5a or 5b, as the other carriage is in contact by the two supports and the two supports 19 of the body are also in contact, whilst the two latter are mounted on shafts, there is an equivalent three point bearing which maintains the conforming assembly in contact with the surface during the extension of the other carriage.

It is also clear that during the displacement of body 15 the vehicle is supported by at least four bearing points and its four supports are thus made to conform with the deflections of the surface by means of one of the actuators 8a, 8b, necessitating to this end a contact pickup on supports 11a or 11b in such a way as to bring about contact of the different supports prior to the engagement of the suction members. By means of the contact pickup and as from the time when the first series of suction members is in contact with the surface it is possible to activate actuator 8a or 8b in the appropriate direction and stop it when the opposite support comes into contact with the surface.

The action of a single actuator 8a is sufficient to make the vehicle conform with the surface during its movement, provided that the latter takes place in or approximately in a straight line. However, if the two tubes 1a, 1b form an angle or are perpendicular it is necessary to use a second actuator 8b to make supports 11b conform with the surface encountered in the perpendicular direction. It is also clear that the separate use of actuators 8b, 8a during successive stages rapidly move axis 4 away from the average perpendicular with respect to the surface. As a result prior to the simultaneous displacement of the two carriages when 1a and 1b are in a straight line the two actuators 8a, and 8b are made to share with equal angles the relative deflection between the groups of supports 11a, 11'a and 11b, 11'b, which is also brought about by very simple automatic means.

It should also be noted that the two actuators 8a and 8b used separately or together for making the vehicle conform with the deflection or twisting of the traversed surface can be replaced by clutches permitting the free pivoting of the carriage corresponding thereto until there is contact engagement of the two supports corresponding thereto, followed by the locking thereof instead of using motorised actuators as described hereinbefore. However, such a system can only be correctly used if the vehicle travels over surfaces which are relatively close to the horizontal.

It is also apparent that during this displacement the free rotation of body 15 about axis 4 would lead it to rotate indefinitely, which more particularly complicates the fitting of suction tubes for bringing about the adhesion of the suction members, whilst supports 19 are brought into a random angle where they could encounter supports 11a and 11b. For this reason when supports 19 are disengaged during the simultaneous translation of the two carriages a return system which can be constituted by annular springs 15' in FIG. 2 returns the supports 19 in such a way that they are substantially parallel to 1a, 1b.

Figure 2:
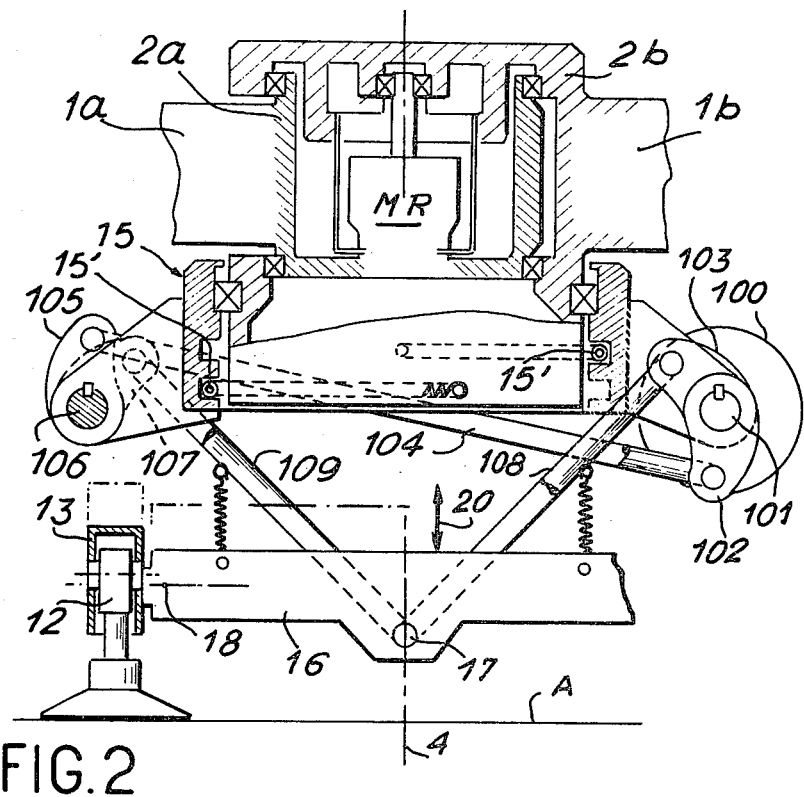
FIG. 2 a vertical axial section of the central body of the vehicle of FIG. 1 showing the way in which the different articulations and the lifting movement are obtained.

FIG. 2 shows in greater detail the construction of members 2a, 2b and their fitting with respect to body 15 about axis 4. MR is a geared motor (having a very high step-down ratio) permitting the control of the relative rotation of tubes 1a and 1b about axis 4.

FIG. 2 also shows the mechanism for raising and lowering the central supports 19. Body 15 carries a geared motor 100, whose shaft 101 has at each end two levers 102 and 103. Lever 102 symmetrically drives shaft 106 by rod 104 and a lever 105 on body 15 of shaft 101 of geared motor 100 with respect to axis 4. Levers 102, 105 have substantially opposite rotations. A lever 107 fixed to shaft 106 has a movement symmetrical to that of lever 103. The two rods 108, 109, respectively mounted on levers 103, 107 attached to shaft 17 displace the latter in accordance with arrow 20. It is pointed out that pivot pins defining shaft 17 and 18 are carried by ring 16.

It should also be noted that the mounting system used in the vehicle of FIG. 1 leads to the transverse stability as from the base of supports 11a, 11'a or 11b, 11'b on either side of the corresponding carrying tube 1a or 1b, whilst conversely body 15 does not lead to any stability because its bearing support on the surface is equivalent to a punctiform bearing as a result of the shaft system 17. Consequently the spacing of supports 11a or 11b is very important. However, in the application where the vehicle shown in FIG. 1 has to enter a narrow passage, such as a manhole giving access to certain parts of an installation vertical with respect to a wall which has to be traversed by the vehicle, it may be necessary to reduce the wheel base to the minimum value corresponding to that of the feet of supports 19, the vehicle being suspended by one of its ends. To this end on the device shown the arms such as 10a are mounted so as to pivot on shafts such as 21a on either side of carriage 5a, whereby one of the said shafts is hidden in FIG. 1. In the same way arms 10b on either side of carriage 5b pivot about a shaft 21b, whereby one of the said shafts is hidden in FIG. 1. This possibility of bending back arms 10a, 10b is obviously not involved in the normal operation of the vehicle according to the invention and merely serves to reduce its frontal cross-section to permit passage of a narrow opening.

Figure 3:
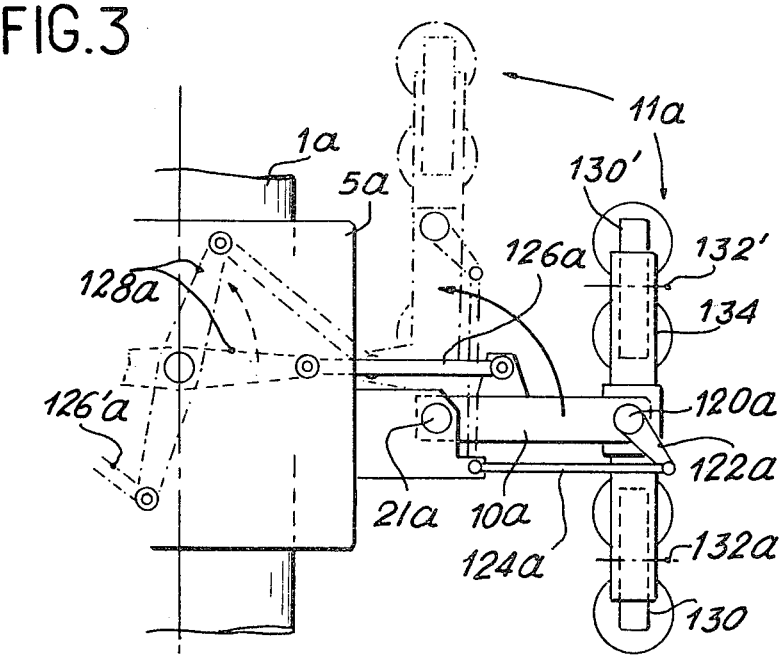
FIG. 3 a partial view of an end carriage showing the device for bending back the arms carrying the support.

FIG. 3 is a half-view from above of the mechanisms permitting the tilting back of the arms such as 10. Arm 10a is pivotably mounted with respect to carriage 5a about a shaft 21a orthogonal to the axis of tube 1a. Support 11a is itself mounted in pivotable manner with respect to arm 10a via a shaft 120a fixed to supports 11a and mounted so as to pivot at the end of arm 10a. Shaft 120a is fixed to a system of rods 122a, 124a, whose other end is articulated to the carriage. This linkage forms a deformable parallelogram with arm 10a. Another system of rods 126a, attached to arm 10a and 126'a attached to arm 10'a is articulated to a rod 128a, associated with a not shown actuator and permits the control of the pivoting of arms 10a, 10'a about symmetrical shafts 21a, 21'a. As a result of the deformable parallelograms the systems of supports remain parallel to themselves during the pivoting of the arms. Moreover the system of rods 126a, 128a is such that a locking position is obtained when the arms are extended.

Figure 4:
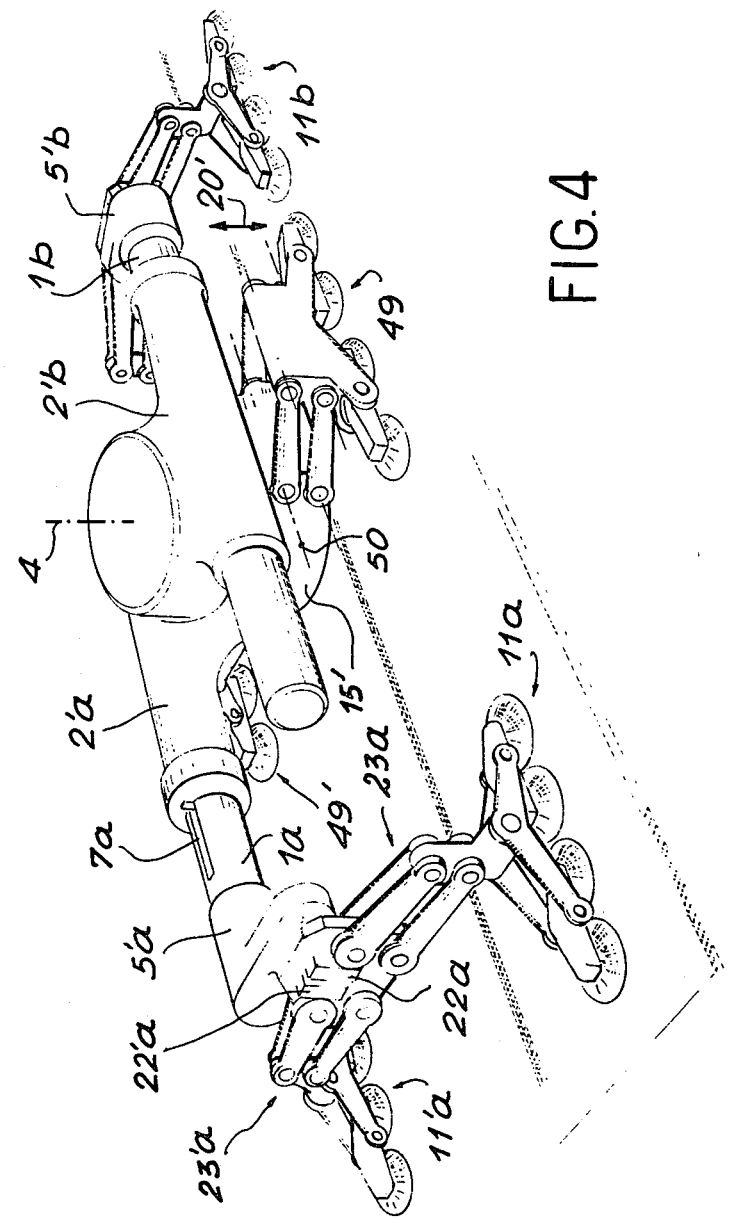
FIG. 4 a perspective view of a second embodiment of the vehicle in which the guidance members are staggered.

FIG. 4 shows a second embodiment of the vehicle according to the invention which differs from the first in that the tubes 1a and 1b in this case do not coincide with the pivoting axis 4, but to which they remain orthogonal at a certain distance which in this case is equal. Thus, the pivoting members have a different arrangement shown in FIG. 4 permitting, as hereinbefore, a deflection angle which is slightly greater than a right angle on either side of the aligned position. A second difference of this embodiment, which is in no way linked with the first difference and which could also apply to the first embodiment, is that the tubes 1a and 1b are fixed to their respective carriages 5'a and 5'b and slide in members 2'a and 2'b, which are equivalent to members 2a and 2b, but which also have a guidance function for tubes 1a and 1b. They constitute the central pivoting articulation of axis 4. This arrangement has the advantage of concentrating the weights corresponding in particular to the sliding actuators in the central part of the vehicle (once again the actuators are not shown so as not to overburden the drawing). Keys and grooves such as 7a ensure the rotational guidance of tubes 1a and 1b in members 2'a, 2'b. This vehicle also differs from the previous embodiment in that body 15', which also pivots freely about axis 4, directly receives two groups of supports 49, 49', each having a lifting movement 20' about axes 50. When movements 20' are identical for supports 49 and symmetrical supports 49' body 15', bearing on the two groups of supports 49 and 49', itself assumes a substantially perpendicular position to the surface on which it is placed. Thus, there is no equivalence with the punctiform bearing obtained by the shaft system in FIG. 1. This feature could also be applied to the first embodiment.

The telescopic carriages 5'a and 5'b also have means for lifting their supports 11a, 11'a, shown in the form of independent actuators 22a, 22'a controlling arms 23a, 23'a. Under these conditions it is clear that the engagement of main body 15' on its two supports 49, 49' by means of the suction members permits, during the extension of tube 1a carrying its carriage 5'a with the raised supports, to bring about independent contact engagements of support 11a and support 11'a, each being controlled by its own lifting mechanism 22a, 22'a. Thus, on uneven or twisting surfaces each will stop in a suitable position, because the stoppage of lifting is controlled by an engagement pickup in contact with the surface. The combination of these two actuators fulfills the function of the twisting movement indicated by arrow 9a in FIG. 1. The same is the case with carriage 5b, which ensures a stability of the vehicle obtained in a different but equivalent manner to the previously described vehicle. The simultaneous displacement of the two tubes within the members 2'a, 2'b is only possible when said tubes 1a, 1b are parallel, which is equivalent to the aligned position of the vehicle of FIG. 1.

FIGS. 5a to 5b diagrammatically show the linear advance of the vehicle in direction F. This displacement method is identical to that described with reference to the first embodiment. The displacement of the vehicle according to the second embodiment (FIG. 4) is identical to that of the first embodiment and it is merely necessary to replace the raising of body 15 which brings about the raising of the non-adhering carriage (5a or 5b) by the raising of the supports of one of the end carriages. The sequence is then as follows (the reference to the drawings being analogous), whereby starting takes place from a position 5a where carriage 5b abuts against member 2b. Carriage 5b is raised and it is extended to the maximum (4a in dotted lines). Carriage 5b is then lowered (FIG. 5b), followed by the raising and moving in of carriage 5a (FIG. 5c). Finally body 15 is moved after raising supports (FIG. 5d) to return to the starting point.

Obviously the angular displacements of all the support systems forming bogies shown in FIGS. 1 and 4 are small when the random surfaces on which the vehicle according to the invention travels have limited curvatures, such as is the case for example with cylindrical, toroidal or spherical surfaces of the main tanks on which such vehicles can carry out surface inspections. Thus, for a known surface all the articulations shown must have an angular amplitude limited by abutments or realised by elastic mountings using anti-vibration supports based on elastomer materials or crossed spring systems.

Figure 7:
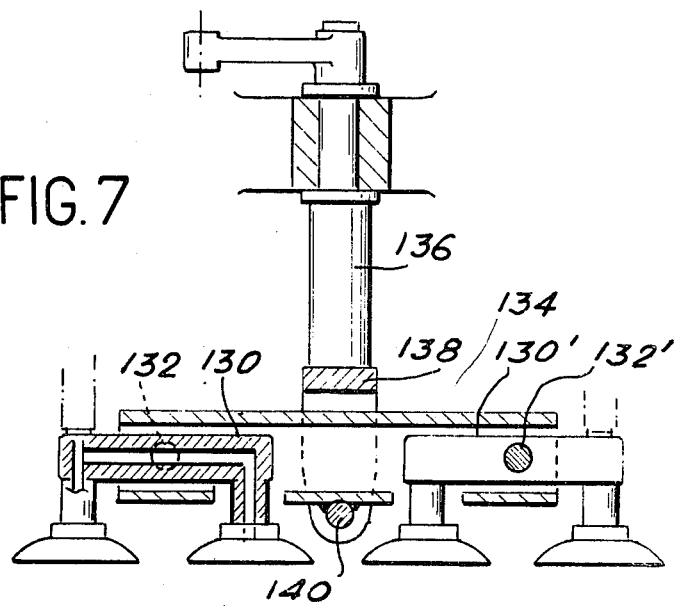
FIG. 7 a partial view showing a constructional varient of the connections between the components of a support.

FIG. 7 shows a preferred embodiment of a support-suction member (four in the example in question) applicable to either of the vehicles of FIGS. 1 and 4. Two suctions members are fixed to the ends of a first lever 130, 130', which are articulated about shafts 132, 132' mounted at the ends of a main lever 134 constituted by a hollow section with a rectangular cross-section in which are located levers 130 and 130'. Lever 134 is itself articulated to the lower end of a rod 136 via a member 138 which spans the lever 134 and traversed by shaft 140 fixed to the lower face of lever 134. It should be noted that as a result of this special mounting system the main articulation axis of the support system is located below the articulation axes of pairs of suction members, which increases the transverse stability of the assembly. This structure has the abutments referred to hereinbefore.

Figure 8:
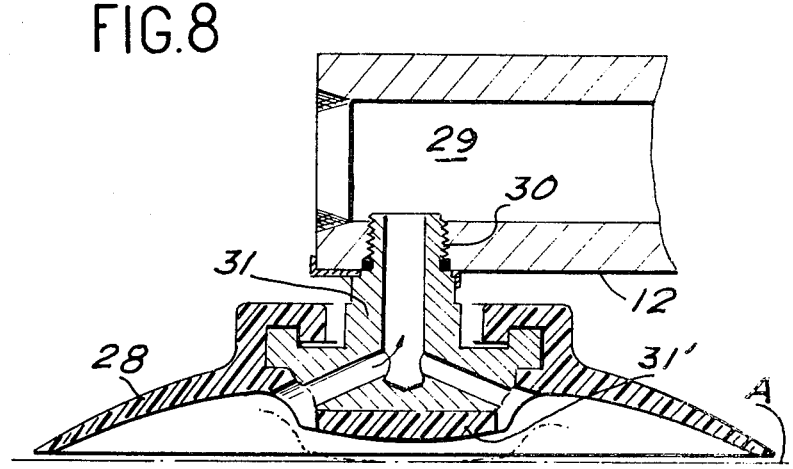
FIG. 8 an enlarged view showing an embodiment of a suction member.

FIG. 8 shows a detail of a suction member according to the invention having a skirt forming the sealing lip 28 and placed under a vacuum by means of a suction action obtained in this case by means of the interior of arm 12 perforated in accordance with 29, which communicates by means of the passage made in the threaded extension 30 with the inside of the suction member, without requiring any flexible tube. Placing under a vacuum leads to the suction member exerting a bearing force on surface A. A convex surface 31' of member 31 constitutes the support of the suction member with the possibility of lip 28 bending by a variable angle. The support surface 31' of the foot formed in this way is also made from an elastomer material where a high friction coefficient is produced, so that the suction of the suction member is converted into a friction action preventing the sliding of the suction member on a non-horizontal surface. Preferably the support surface 31' and skirt 28 are moulded in one piece on member 31, as can be seen in FIG. 8. It can also be seen that the use of the spherical surface makes it possible to maintain the operation of this suction member up to angular displacement due to the action of the curvature of the surface on the distance between two consecutive suction members and laterally between two supports. Obviously this angle remains very small with respect to standard radii of curvature. As stated hereinbefore this suction member can also have other uses.

It is also obvious that by appropriately controlling the actuators associated with the sliding movement of the carriages relative to the tubes or the tubes relative to the member it is possible for the vehicle to cross discontinuities such as holes or breaks in the wall on which the vehicle is moving.

Figure 9A:
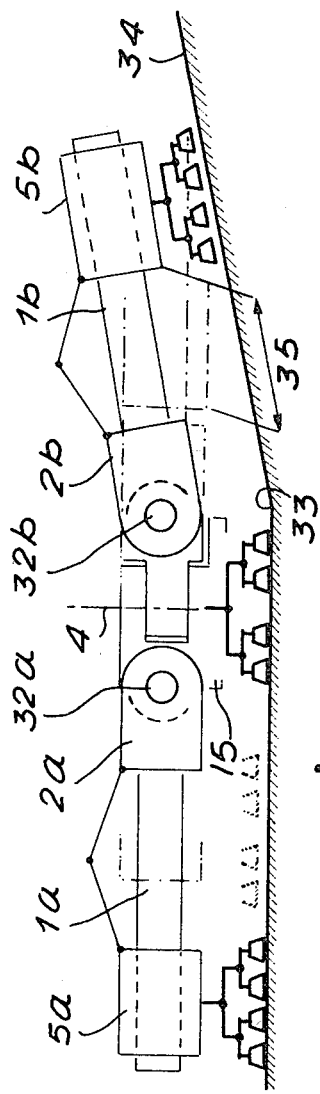
FIGS. 9a, 9b and 9c constructional varients of the vehicle according to one of the two embodiments permitting movement on a wall having a dihedron.
Figure 9B:
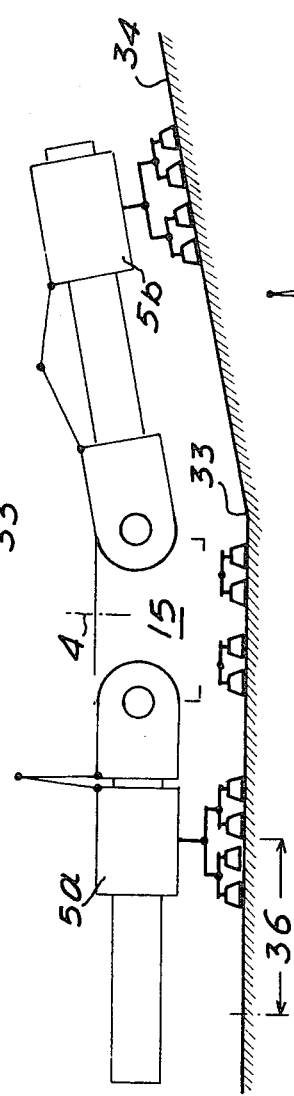
Figure 9C:
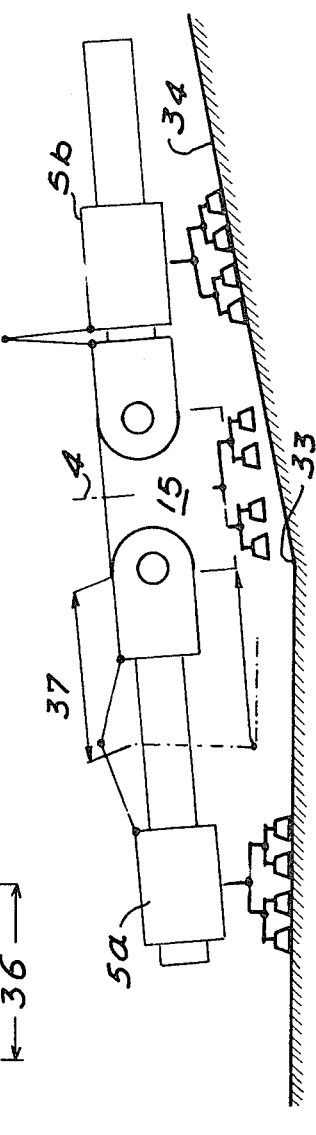

FIGS. 9a to 9c show improvements to vehicles according to the invention, such as shown in FIGS. 1 and 4, permitting the crossing of angular surface discontinuities. FIG. 9a shows a vehicle based on that of FIG. 1 to which has been added two complimentary pivoting axes perpendicular to the basic pivoting axis 4, said axes 32a and 32b enabling an angle of at least 45° to be given to tubes 1a and 1b carrying the carriages 5a, 5b. Actuators are associated with each of these two pivoting axes, but are not shown in the drawing. It can be seen that when placed in front of a ridge dihedron 33 during the forward movement of carriage 5b it is possible by actuating shaft 32b perpendicular to tube 1b and to axis 4 to make said tube 1b substantially parallel to the portion 34 following ridge 33.

FIG. 9a shows for portion b of the vehicle in dotted line form the position of carriage 5b and tube 1b before attacking the gradient. Continuous lines show the raising of tube 1b and the displacement of carriage 5b by one stage 35. In FIG. 9b carriage 5b has not moved, but carriage 5a has been moved up by one stage 36. Finally in FIG. 9c by acting on the control of shaft 32b body 15 is raised and moved in order to bring it to the right of ridge 33 in the raised position (stage 37). It is then only necessary to lower the central body 15 for it to again come into contact with surface A by means of its supports.

It would also be possible to pass over a 90° ridge by using the active twisting movements of carriages 5a, 5b of the vehicle and these movements are shown by arrows 9a and 9b in FIG. 1.

Finally it is obvious that the vehicle according to any of the embodiments described has supply connections 152 (electrical, pneumatic or hydraulic) for controlling the various actuators and the adhesion means from a fixed control assembly 150 (see FIG. 1). This control assembly can be controlled on the basis of information supplied by a television camera. It can also be controlled by a programme and automatic means corresponding to the information to be transmitted to the actuators and to the control of the adhesion means.

The invention is not limited to the embodiments described and represented hereinbefore and various modifications can be made thereto without passing beyond the scope of the invention.

What is claimed is:

1. A vehicle able to move by adhesion on a random surface comprising:

a central body defining a pivoting axis which remains substantially perpendicular to a surface and which has two groups of central supports which adhere to said surface and which are arranged symmetrically with respect to the pivoting axis; first and second carriages, each provided with two groups of adhesive end supports;

first and second members for guidance in rectilinear translation and without rotation of the first and second carriages in accordance with two directions which remain substantially orthogonal to the pivoting axis, the two groups of end supports associated with a respective carriage being arranged symmetrically relative to a plane containing the rectilinear translation axis and said pivoting axis and connected to the carriage by arms;

displacement means for independently actuating the first and second carriages along the guidance members;

displacement means for pivoting about said pivoting axis the first and second guidance members, the groups of central supports being mounted for rotation relative to said body; means for rotating the groups of central supports about the pivoting axis;

means for bringing about conformity of the position of the pairs of groups of end supports with said surface; in combination with means for controlling the adhesion state on the surface or the non-adhesion of said supports, and means for controlling the displacement means in such a way that the relative pivoting of one of the guidance means about the pivoting axis or the translation of one of said carriages is only possible if the supports associated with the carriage are not adhering to the surface and if simultaneously the groups of central supports and those of the other carriage adhere on said surface and in such a way that the displacement in translation of the two carriages relative to the guidance members is only possible if the groups of central supports are disengaged with respect to said surface and the groups of supports associated with the carriages are adhering to the surface.

2. A vehicle according to claim 1, wherein the adhering supports are constituted by pneumatic or hydraulic suction members.

3. A vehicle according to claim 1, wherein the adhering supports are constituted by electromagnetic members.

4. A vehicle according to claim 1, wherein said rectilinear translation guidance means comprise two tubes, a first end of each tube being fixed to a member which is able to rotate about the pivoting axis defined by the central body, the axes of the two tubes intersecting said pivoting axis at the same point, and wherein each carriage is able to slide on the tube associated therewith.

5. A vehicle according to claim 4, wherein the two groups of central supports are fixed to the end of two arms pivotally mounted on a ring about a first axis, said ring being pivotally mounted on the central body about a second axis perpendicular to the first axis, said first and second axes coinciding with the pivoting axis.

6. A vehicle according to claim 5, wherein the means for bringing about the displacement of the central supports in accordance with the direction of the pivoting axis comprise a first shaft parallel to the direction of the guidance members in the inoperative state and means for rotating the shaft about its longitudinal axis with respect to the central body, a second shaft parallel to the first shaft and mounted so as to pivot about its longitudinal axis with respect to the body, a ring on which are mounted the two groups of supports in such a way that they pivot about said first axis perpendicular to the shafts, two first rod/arm assemblies integral with the ends of the first shaft and the ends of a third shaft carried by the ring and defining said second axis, two second rod/arm assemblies integral with the ends of the second shaft and the ends of the third shaft and means for transmitting a rotation movement in a direction opposite to that of the first shaft to the second shaft from said first shaft.

7. A vehicle according to claim 2, wherein each group of end supports is mounted at the end of an arm so as to pivot about a first axis orthogonal to the axis of the associated guidance member, said arm being itself mounted with respect to the associated carriage so as to pivot about a second axis parallel to the first, each carriage has means for bringing about the pivoting of the two arms associated therewith about the two second axes and each arm has a linkage system for maintaining each group of supports parallel to the axis of the associated guidance member during the pivoting of said arms.

8. A vehicle according to claim 4, wherein each carriage is provided with controllable means for bringing about the rotation of said carriage about the axis of the tube associated therewith.

9. A vehicle according to claim 4, wherein the first end of each tube is connected to the member by means of an articulation permitting a relative movement about an axis orthogonal to the pivoting axis and perpendicular to the axis of said tube, said articulation being provided with means for carrying out this movement.

10. A vehicle according to claim 1, wherein the rectilinear translation guidance means comprise two tubes, a first end of each tube being able to slide in a part forming a member which is able to pivot about said pivoting axis defined by the central body, said part further forming a guide for the sliding of said associated tube in accordance with an axis orthogonal to the pivoting axis, but which does not intersect it, whilst the second end of each tube is fixed to one of the said carriages, each tube being immobilised in rotation with respect to the member.

11. A vehicle according to claim 10, wherein each of the two groups of central supports is fixed to the end of an arm, whose other end is connected to the central body by an articulation about an axis orthogonal to the pivoting axis, each articulation being associated with a controllable means for bringing about the displacement of the associated arm.

12. A vehicle according to claim 10, wherein the arms on which are mounted said groups of end supports are articulated with respect to the corresponding carriage about an axis parallel to the axis of the tube associated with said carriage, each articulation being provided with controllable means for bringing about the movement of the arm.

13. A controllable suction member comprising: a flared skirt made from an elastic material and having a closed bottom and a free edge constituting a deformable lip, a supporting member arranged within said skirt and fixed to said bottom, said member projecting towards the free edge to define a supporting surface made from a material with a high friction coefficient, and means for producing a vacuum within the skirt, said supporting surface being convex and allowing bending of the lip, at a variable angle to accommodate a non-horizontal surface.

14. A suction member according to claim 13, wherein the bearing supporting surface is spherical.

* * * * *